(12) United States Patent
Cha et al.

(10) Patent No.: US 9,618,812 B2
(45) Date of Patent: Apr. 11, 2017

(54) LIQUID CRYSTAL DISPLAY AND METHOD OF FABRICATING THE SAME

(71) Applicant: Samsung Display Co., Ltd., Yongin, Gyonggi-Do (KR)

(72) Inventors: Tae Woon Cha, Seoul (KR); Sang Gun Choi, Gyeonggi-do (KR); Ha Young Park, Gyeonggi-do (KR)

(73) Assignee: Samsung Display Co., Ltd. (KR)

( * ) Notice: Subject to any disclaimer, the term of this patent is extended or adjusted under 35 U.S.C. 154(b) by 218 days.

(21) Appl. No.: 14/173,636

(22) Filed: Feb. 5, 2014

(65) Prior Publication Data

US 2015/0092143 A1 Apr. 2, 2015

(30) Foreign Application Priority Data

Sep. 30, 2013 (KR) .................. 10-2013-0116372

(51) Int. Cl.
| G02F 1/1362 | (2006.01) |
|---|---|
| G02F 1/1333 | (2006.01) |
| G02F 1/1341 | (2006.01) |
| G02F 1/1335 | (2006.01) |

(52) U.S. Cl.
CPC ...... *G02F 1/136209* (2013.01); *G02F 1/1341* (2013.01); *G02F 1/133377* (2013.01); *G02F 1/133512* (2013.01); *G02F 2001/133368* (2013.01); *G02F 2001/136218* (2013.01)

(58) Field of Classification Search
CPC ......... G02F 1/133512; G02F 1/136209; G02F 1/133322; G02F 1/133377; G02F 1/133514; G02F 2001/136218; G02F 2001/136222
See application file for complete search history.

(56) References Cited

U.S. PATENT DOCUMENTS

2004/0263726 A1* 12/2004 Song .................. G02B 5/201
349/110

FOREIGN PATENT DOCUMENTS

| KR | 2003-0057682 | 7/2003 |
|---|---|---|
| KR | 2006-0041746 | 5/2006 |
| KR | 2012-0026880 | 3/2012 |
| KR | 2013-0042307 | 4/2013 |

* cited by examiner

*Primary Examiner* — Dung Nguyen
(74) *Attorney, Agent, or Firm* — Innovation Counsel LLP

(57) ABSTRACT

Provided are a liquid crystal display and a method of fabricating the liquid crystal display. The liquid crystal display comprises: a substrate; a signal electrode on the substrate; a first light-blocking pattern on the signal electrode and having a trench extending to and exposing at least part of the signal electrode; and a second light-blocking pattern on the trench of the first light-blocking pattern and covering the signal electrode, wherein the second light-blocking pattern comprises at least one metal layer.

18 Claims, 8 Drawing Sheets

LIQUID CRYSTAL DISPLAY AND METHOD OF FABRICATING THE SAME

This application claims priority from Korean Patent Application No. 10-2013-0116372 filed on Sep. 30, 2013 in the Korean Intellectual Property Office, the disclosure of which is incorporated herein by reference in its entirety.

BACKGROUND

1. Field

The present application relates to a liquid crystal display and a method of fabricating the same.

2. Description of the Related Art

Liquid crystal displays (LCDs) are one of the most widely used types of displays. In a LCD, voltages are applied to two facing electrodes (a pixel electrode and a common electrode) to control the arrangement of liquid crystal molecules of a liquid crystal layer interposed between the two electrodes. Accordingly, the amount of light that transmits through the liquid crystal layer is adjusted.

Generally, a LCD maintains a gap between two substrates to have a liquid crystal layer between the two substrates. To this end, a spacer is formed between the two substrates. However, since the spacer is attached to one of the two substrates using an adhesive, it may complicate the process of fabricating the LCD and increase the fabrication cost.

In order to simplify the process of fabricating the LCD and reduce the fabrication cost, a cavity that provides a space for the formation of the liquid crystal layer may be formed on one substrate, instead of the spacer formed between the two substrates.

The cavity may be formed by forming a sacrificial layer, a common electrode, a passivation layer and a cover layer on one substrate and then removing the sacrificial layer. The cavity has an entrance to provide a passage through which liquid crystals are injected into the cavity. The entrance of the cavity is opened when the liquid crystals are injected into the cavity and is sealed after the completion of the injection of the liquid crystals.

In the LCD having the cavity, a light-blocking pattern that blocks unnecessary light for the formation of an image may be disposed near the entrance of the cavity. The light-blocking pattern is typically formed of light-blocking organic matter. However, the organic matter makes it difficult to adjust a thickness of an element that is to be formed. Thus, the element can be formed unwantedly thick. Accordingly, the thick light-blocking pattern may act as a barrier when the liquid crystals are injected into the cavity, thereby making the injection of the liquid crystals into the cavity difficult.

SUMMARY

Embodiments provide a liquid crystal display (LCD) which can facilitate the injection of liquid crystals into a cavity by having a thin light-blocking pattern.

Embodiments also provide a method of fabricating a LCD, the method capable of facilitating the injection of liquid crystals into a cavity by forming a thin light-blocking pattern.

However, embodiments are not restricted to the ones set forth herein. The above and other embodiments will become more apparent to one of ordinary skill in the art to which the embodiments pertain by referencing the detailed description given below.

According to an embodiment, there is provided a liquid crystal display. The liquid crystal display comprises: a substrate; a signal electrode on the substrate; a first light-blocking pattern on the signal electrode and having a trench extending to at least part of the signal electrode; and a second light-blocking pattern on the trench of the first light-blocking pattern and covering the signal electrode, wherein the second light-blocking pattern comprises at least one metal layer.

According to another embodiment, there is provided a method of fabricating a liquid crystal display. The method comprises: forming a signal electrode on a substrate; forming a first light-blocking pattern, which has a trench extending to at least part of the signal electrode, on the signal electrode; and forming a second light-blocking pattern, which covers the signal electrode and comprises at least one metal layer, on the trench of the first light-blocking pattern.

BRIEF DESCRIPTION OF THE DRAWINGS

The above and other aspects and features of embodiments will become more apparent by describing in detail exemplary embodiments thereof with reference to the attached drawings, in which.

DETAILED DESCRIPTION

Figure 1:
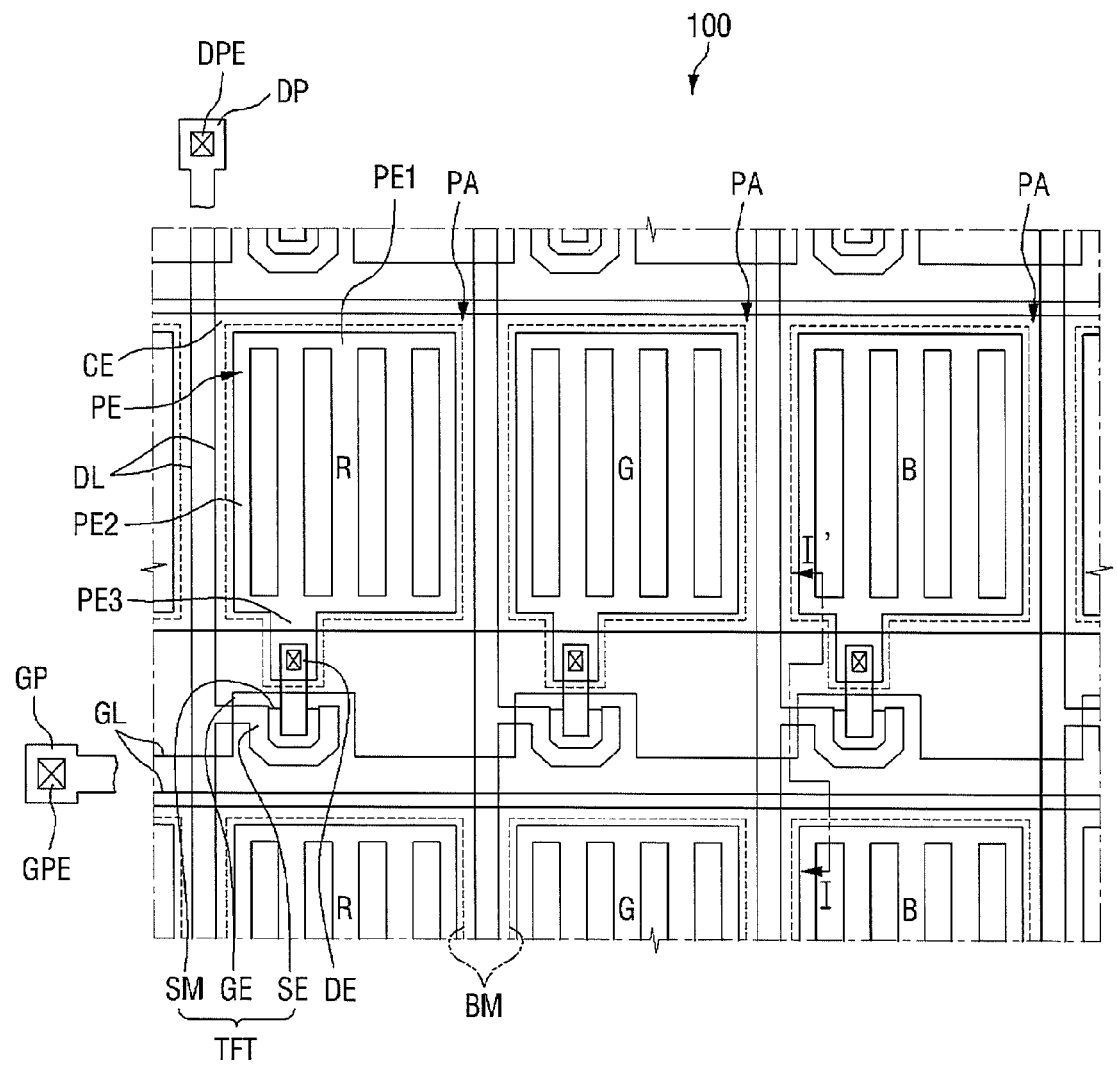
FIG. 1 is a plan view of a liquid crystal display (LCD) according to an embodiment.

Embodiments may be understood more readily by reference to the following detailed description and the accompanying drawings. Embodiment may, however, be embodied in many different forms and should not be construed as being limited to the embodiments set forth herein. Rather, these embodiments are provided so that this disclosure will be thorough and complete and will fully convey the inventive concept to those skilled in the art. Like reference numerals refer to like elements throughout the specification.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

It will be understood that when an element or layer is referred to as being "on", "connected to" or "coupled to" another element or layer, it can be directly on, connected or coupled to the other element or layer or intervening elements or layers may be present. In contrast, when an element is referred to as being "directly on", "directly connected to" or "directly coupled to" another element or layer, there are no intervening elements or layers present. As used herein, the term "and/or" includes any and all combinations of one or more of the associated listed items.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the embodiment.

Spatially relative terms, such as "beneath", "below", "lower", "above", "upper", and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

Unless otherwise defined, all terms (including technical and scientific terms) used herein have the same meaning as commonly understood by one of ordinary skill in the art to which the embodiment belongs. It will be further understood that terms, such as those defined in commonly used dictionaries, should be interpreted as having a meaning that is consistent with their meaning in the context of the relevant art and this specification and will not be interpreted in an idealized or overly formal sense unless expressly so defined herein.

Embodiments will now be described more fully with reference to the accompanying drawings, in which exemplary embodiments are shown. First of all, the structure of a display device fabricated using a method of fabricating a display device according to an embodiment will be described.

Figure 2:
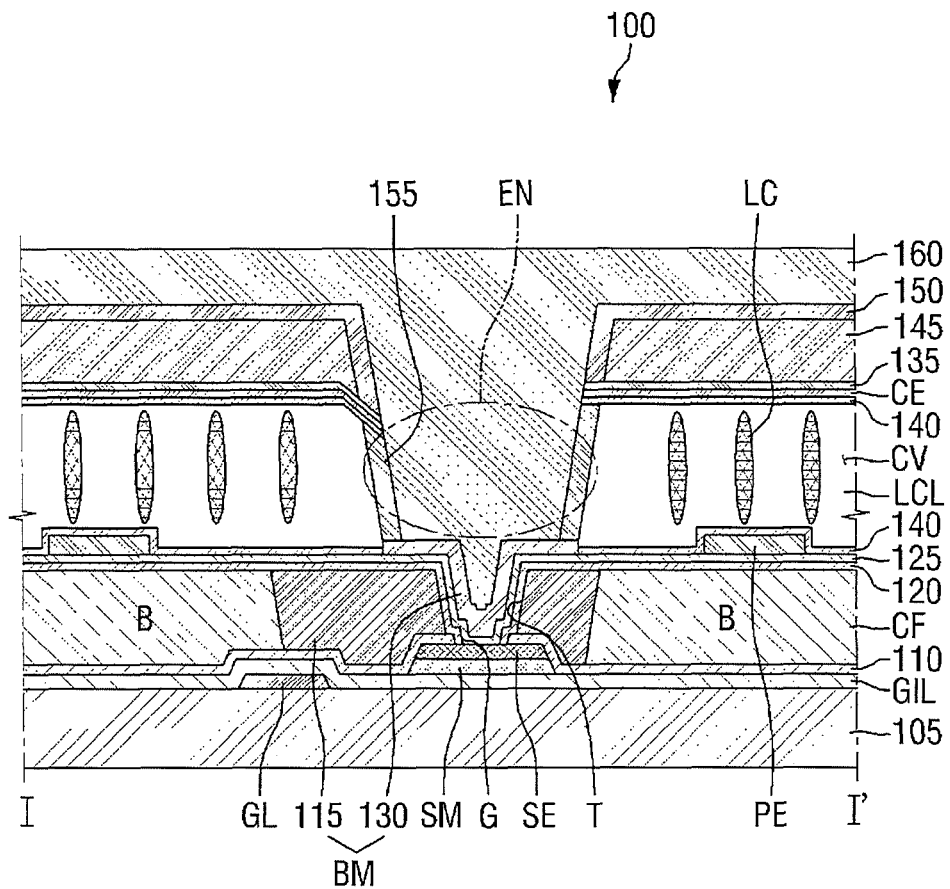
FIG. 2 is a cross-sectional view taken along the line I-I' of FIG. 1.
Figure 3:
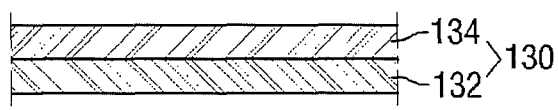
FIG. 3 is a cross-sectional view illustrating the layered structure of a second light-blocking pattern of FIG. 2.
Figure 4:
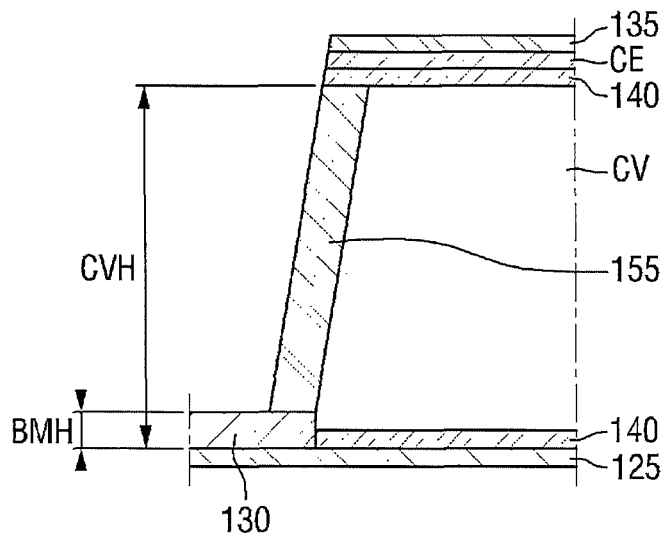
FIG. 4 is a cross-sectional view illustrating the relationship between a height of the second light-blocking pattern of FIG. 2 and a height of a cavity of FIG. 2.

FIG. 1 is a plan view of a liquid crystal display (LCD) 100 according to an embodiment. FIG. 2 is a cross-sectional view taken along the line I-I' of FIG. 1. FIG. 3 is a cross-sectional view illustrating the layered structure of a second light-blocking pattern 130 of FIG. 2. FIG. 4 is a cross-sectional view illustrating the relationship between a height BMH of the second light-blocking pattern 130 of FIG. 2 and a height CVH of a cavity CV of FIG. 2.

Referring to FIGS. 1 and 2, the LCD 100 may include a substrate 105, a gate line GL, a data line DL, a gate insulating layer GIL, a thin-film transistor TFT, an insulating layer 110, color filters CF, a first light-blocking pattern 115, a first capping layer 120, a first passivation layer 125, a pixel electrode PE (or a first electrode), the second light-blocking pattern 130, a common electrode CE (or a second electrode), a second passivation layer 135, an alignment layer 140, a cover layer 145, a third passivation layer 150, a sealing layer 155, and a second capping layer 160.

The substrate 105 may be a transparent insulating substrate. The substrate 105 may have a plurality of pixel areas PA, each being defined by the gate line GL and the data line DL.

The gate line GL is formed on the substrate 105 to extend in a first direction and delivers a gate signal. An end of the gate line GL is connected to a gate pad GP. A gate pad electrode GPE may be formed on the gate pad GP. The gate pad electrode GPE is a contact electrode that connects an external wiring for transmitting a signal to the pixel electrode PE.

The data line DL is formed on the substrate 105 to extend in a second direction that intersects the first direction. The data line DL is insulated from the gate line GL and delivers a data signal. An end of the data line DL is connected to a data pad DP. A data pad electrode DPE may be formed on the data pad DP. The data pad electrode DPE is another contact electrode that connects the external wiring for transmitting a signal to the pixel electrode PE.

The gate insulating layer GIL covers the gate line GL and the gate pad GP formed on a surface of the substrate 105 and is formed of an insulating material. The gate insulating layer GIL may include, for example, silicon nitride or silicon oxide. The data line DL and the data pad DP may be formed on the gate insulating layer GIL.

The thin-film transistor TFT includes a gate electrode GE, a semiconductor layer SM, a source electrode SE, and a drain electrode DE.

The gate electrode GE is a control electrode. The gate electrode GE may protrude from the gate line GL toward the semiconductor layer SM when viewed from above. The gate electrode GE may include any one of indium tin oxide (ITO), indium zinc oxide (IZO), and indium tin zinc oxide (ITZO). In addition, the gate electrode GE may have a double-layer structure including a first electrode layer which is formed of any one of the above materials and a second electrode layer which is formed of a material which will be described later. The second electrode layer may be a metal such as copper (Cu), molybdenum (Mo), aluminium (Al), tungsten (W), chrome (Cr) or titanium (Ti) or may be an alloy containing at least one of the above metals.

The semiconductor layer SM is formed on the gate electrode GE with the gate insulating layer GIL interposed therebetween. The semiconductor layer SM may include an active layer provided on the gate insulating layer GIL and an ohmic contact layer provided on the active layer. The semiconductor layer SM may be formed between the data line DL and the gate insulating layer GIL. In addition, the semiconductor layer SM may be formed between the data pad DP and the gate insulating layer GIL.

The source electrode SE is a signal electrode. The source electrode SE protrudes from the data line DL and overlaps at least part of the gate electrode GE when viewed from above. The drain electrode DE is a signal electrode. The drain electrode DE is separated from the source electrode SE and overlaps at least part of the gate electrode GE when viewed from above. Each of the source electrode SE and the drain electrode DE may be a metal such as Cu, Mo, Al, W, Cr or Ti or may be an alloy containing at least one of the above metals. Here, the source electrode SE and the drain electrode DE partially overlap the semiconductor layer SM in a region excluding a region between the source electrode SE and the drain electrode DE.

The insulating layer 110 is formed on the gate insulting layer GIL. The insulating layer 110 may have through holes that expose the drain electrode DE, the gate pad GP and the data pad DP. The insulating layer 110 may include, for example, silicon nitride or silicon oxide.

The color filters CF are formed on the insulating layer 110 to correspond to the pixel areas PA, respectively. Each of the color filters CF provides a color to light that transmits through a liquid crystal layer LCL. Each of the color filters CF may be one of a red filter R, a green filter G and a blue filter B. However, the color filters CF are not limited to the filters of the above-mentioned colors.

The first light-blocking pattern 115 is formed on the same layer as the color filters CF on the substrate 105. Specifically, the first light-blocking pattern 115 may be formed on the insulating layer 110 at an edge of each pixel area PA. That is, the first light-blocking pattern 115 may surround the color filters CF. The first light-blocking pattern 115 is formed of light-blocking organic matter and blocks unnecessary light for the formation of an image. For example, the first light-blocking pattern 115 may prevent the leakage of light that may occur at an edge of the liquid crystal layer LCL due to abnormal behaviour of the liquid crystal layer LCL or prevent color mixing that may occur at an edge of each of the color filters CF.

The first light-blocking pattern 115 is disposed on the insulating layer 110 at the edge of each pixel area PA. The first light-blocking pattern 115 may be disposed on a signal electrode, e.g., the source electrode SE of the thin-film transistor TFT. The first light-blocking pattern 115 may have a trench T which extends to and exposes at least part of the source electrode SE. The trench T of the first light-blocking pattern 115 may provide a path through which a test tip used to test whether the thin-film transistor TFT is defective can contact the source electrode SE of the thin-film transistor TFT.

The first capping layer 120 is formed on the color filters CF and the first light-blocking pattern 115. That is, the first capping layer 120 is formed to cover the color filters CF, the first light-blocking pattern 115, and the source electrode SE. The first capping layer 120 may planarize and protect the color filters CF and the first light-blocking pattern 115 and may be formed of organic matter.

The first capping layer 120 may provide a space in which a test tip used to test whether the thin-film transistor TFT is defective can contact the source electrode SE of the thin-film transistor TFT. To this end, the first capping layer 120 may have an exposing groove G which extends to and partially exposes the source electrode SE within the trench T of the first light-blocking pattern 115.

The first passivation layer 125 is formed along the first capping layer 120 to cover the exposing groove G of the first capping layer 120. The first passivation layer 125 protects the first capping layer 120 and the second light-blocking pattern 130. Thus, the first passivation layer 125 can reduce the damage to the first capping layer 120 or the second light-blocking pattern 130 due to an $O_2$ ashing process performed to remove residues in the cavity CV at the last stage of forming the cavity CV into which liquid crystal molecules LC are injected. The first passivation layer 125 may be formed of silicon nitride or silicon oxide.

The pixel electrode PE is formed on each of the color filters CF. Specifically, the pixel electrode PE is formed on the first passivation layer 125 to correspond to each pixel area PA and is connected to the drain electrode DE. When viewed from above, the pixel electrode PE includes at least one stem portion PE1, a plurality of branch portions PE2 which protrude from the stem portion PE1, and a connecting portion PE3 which connects the stem portion PE1 and the drain electrode DE. The branch portions PE2 are separated from each other by a predetermined gap. The branch portions PE2 may expend parallel to each other in a predetermined direction. The arrangement pattern of the stem portion PE1 and the branch portions PE2 is not limited to the arrangement pattern of FIG. 1. The stem portion PE1 and the branch portions PE2 may be arranged in various patterns. The pixel electrode PE may be formed of a transparent conductive material such as ITO.

The second light-blocking pattern 130 is formed on the first passivation layer 125, specifically, on the trench T of the first light-blocking pattern 115, and covers the source electrode SE of the thin-film transistor TFT. The second light-blocking pattern 130 may be conformally formed along inner walls of the trench T of the first light-blocking pattern 115. After the thin-film transistor TFT is tested (to identify whether it is defective) through the trench T of the first light-blocking pattern 115, the second light-blocking pattern 130 may seal the source electrode SE of the thin-film transistor TFT. In addition, the second light-blocking pattern 130 may block unnecessary light in the region of the trench T of the first light-blocking pattern 115. That is, the second light-blocking pattern 130 may form one light-blocking pattern BM together with the first light-blocking pattern 115 in order to prevent color mixing that may occur at the edge of each of the color filters CF.

The second light-blocking pattern 130 may include at least one metal layer (or a low-reflective metal layer) that can block light. The metal layer may be formed of any one metal selected from Cr, CrOx, IZO, Ti, Al and Ni. For example, the second light-blocking pattern 130 may include two metal layers. Referring to FIG. 3, the second light-blocking pattern 130 may include, for example, a Ti-containing first metal layer 132 and an IZO-containing second metal layer 134 formed on the first metal layer 132. Accordingly, the second light-blocking pattern 130 may serve as a low-reflective layer. Thus, light provided by a backlight (not shown) disposed under the substrate 105 can be prevented from being reflected by the second light-blocking pattern 130 back to the backlight.

Since the second light-blocking pattern 130 is formed of a metal whose thickness can be easily adjusted, it can have a desired small thickness. Accordingly, referring to FIG. 4, the second light-blocking pattern 130 can be formed such that the height BMH of the second light-blocking pattern 130 from a flat surface of the first passivation layer 125 is equal to or less than approximately one tenth of the height CVH of the cavity CV from the flat surface of the first passivation layer 125. In this case, the second light-blocking pattern 130 does not act as a barrier that blocks injection of liquid crystal molecules LC into the cavity CV through an entrance EN of the cavity CV. Thus, the liquid crystal molecules LC can be easily injected into the cavity CV.

The common electrode CE is formed on the pixel electrode PE to be insulated and separated from the pixel electrode PE. Accordingly, the cavity CV is defined between the common electrode CE and the pixel electrode PE. The liquid crystal molecules LC are injected into the cavity CV, thereby forming the liquid crystal layer LCL. Here, the injection of the liquid crystal molecules LC may be achieved through the open entrance EN of the cavity CV. The entrance EN of the cavity CV is formed along the first direction of the substrate 105 and located at a position which overlaps the gate line GL. The common electrode CE may be formed of ITO or IZO.

The second passivation layer 135 is formed on the whole surface of the common electrode CE and protects the common electrode CE. The second passivation layer 135 may be formed of at least one of SiNx, SiOx, and SiOxNy. An end of a stacked structure of the second passivation layer 135 and the common electrode CE may slope toward the substrate 105. This can prevent a liquid crystal alignment material injected into the cavity CV to form the alignment layer 140 from drying too fast at the entrance EN of the cavity CV. As a result, the non-uniform formation of the alignment layer 140 within the cavity CV can be minimized.

The alignment layer 140 is formed along the inner walls of the cavity CV and covers the pixel electrode PE. The alignment layer 140 may be formed of a liquid crystal alignment material such as polyamic acid, polysiloxane, or polyimide.

The cover layer 145 is formed on the second passivation layer 135. The cover layer 145 has a through hole formed by removing a portion of the cover layer 145, which corresponds to the entrance EN for injecting the liquid crystal molecules LC into the cavity CV, by using a photolithography process. The cover layer 145 may be formed of an organic material.

The third passivation layer 150 is formed on the cover layer 145. The third passivation layer 150 has a through hole formed by removing a portion of the third passivation layer 150, which corresponds to the entrance EN for injecting the liquid crystal molecules LC into the cavity CV, by using a photolithography process. The third passivation layer 150 may be formed of SiNx.

A sealing layer 155 seals the entrance EN of the cavity CV. The sealing layer 155 may be formed of a sealing material that does not react with the liquid crystal molecules LC injected into the cavity CV.

The second capping layer 160 is formed on the third passivation layer 150 and planarizes and protects the third passivation layer 150 and other elements disposed under the third passivation layer 150. The second capping layer 160 may be formed of an insulating material.

Although not shown in the drawings, the LCD 100 may further include an encapsulation layer formed on the second capping layer 160. The encapsulation layer may negate the need for a substrate which is coupled to another substrate on which a thin-film transistor is formed in a conventional LCD.

In the LCD 100 structured as described above, the thin-film transistor TFT is turned on in response to a driving signal provided through the gate line GL. When the thin-film transistor TFT is turned on, an image signal provided through the data line DL is provided to the pixel electrode PE through the thin-film transistor TFT. Accordingly, an electric field is formed between the pixel electrode PE and the common electrode DE, and liquid crystals of the liquid crystal layer LC are driven by the electric field. As a result, an image is displayed.

In the LCD 100 according to the current embodiment, since the second light-blocking pattern 130 is formed thin by using a metal as described above, the height BMH of the second light-blocking pattern 130 from the flat surface of the first passivation layer 125 may be far smaller than the height CVH of the cavity CV from the flat surface of the first passivation layer 125.

Accordingly, in the LCD 100 according to the current embodiment, the second light-blocking pattern 130 does not act as a barrier when the liquid crystal molecules LC are injected through the entrance EN of the cavity CV. This can make it easy to inject the liquid crystal molecules LC into the cavity CV.

A LCD according to another embodiment will now be described.

Figure 5:
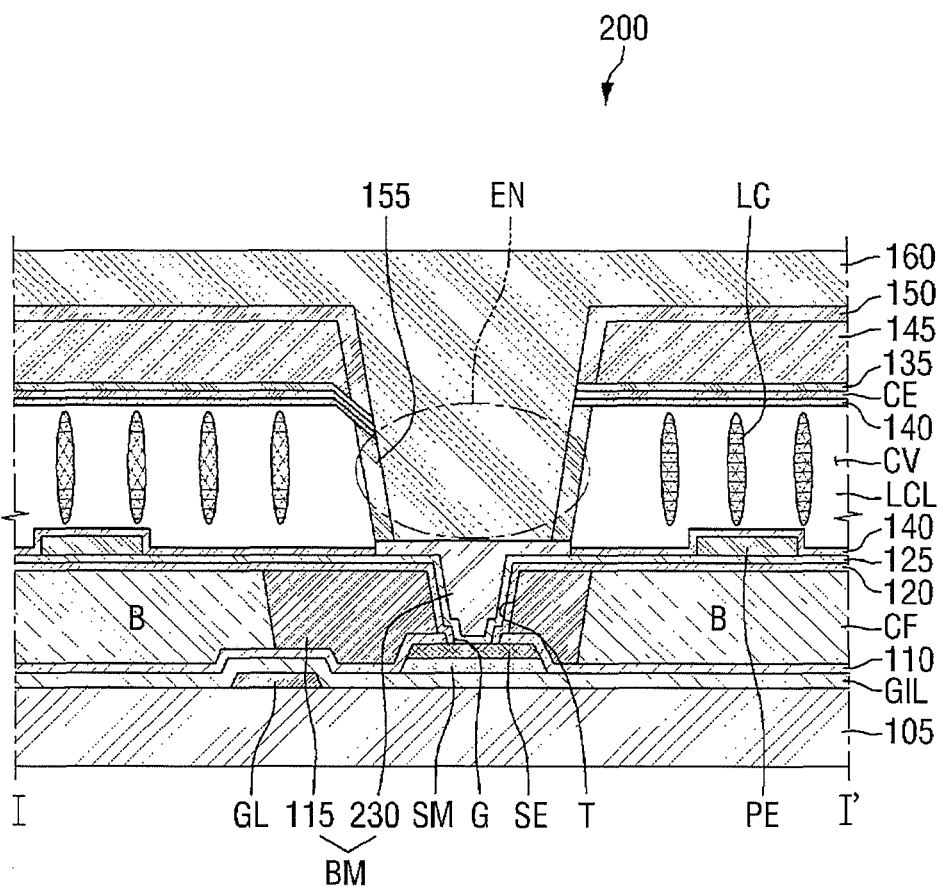
FIG. 5 is a cross-sectional view of a part of a LCD according to another embodiment which corresponds to the part shown in FIG. 2.

FIG. 5 is a cross-sectional view of a part of a LCD 200 according to another embodiment which corresponds to the part shown in FIG. 2.

The LCD 200 according to the current embodiment is different from the LCD 100 of FIG. 2 only in the shape of a second light-blocking pattern 230. Accordingly, the LCD 200 according to the current embodiment will be described, focusing mainly on the second light-blocking pattern 230.

The LCD 200 according to the current embodiment may include a substrate 105, a gate line GL, a data line DL, a gate insulating layer GIL, a thin-film transistor TFT, an insulating layer 110, color filters CF, a first light-blocking pattern 115, a first capping layer 120, a first passivation layer 125, a pixel electrode PE (or a first electrode), the second light-blocking pattern 230, a common electrode CE (or a second electrode), a second passivation layer 135, an alignment layer 140, a cover layer 145, a third passivation layer 150, a sealing layer 155, and a second capping layer 160.

The second light-blocking pattern 230 is similar to the second light-blocking pattern 130 of FIG. 2. However, the second light-blocking pattern 230 is formed to fill at least part of a trench T of the first light-blocking pattern 115. This is possible because the second light-blocking pattern 230 is formed by a printing process such as inkjet printing. Also, this simplifies the process of forming the second light-blocking pattern 230.

The second light-blocking pattern 230 is formed of the same material as the second light-blocking pattern 130 of FIG. 2. The relationship between a height of the second light-blocking pattern 230 and a height of a cavity CV is the same as the relationship between the height BMH of the second light-blocking pattern 130 and the height CVH of the cavity CV in FIG. 2. Therefore, the second light-blocking pattern 230 also does not act as a barrier that prevents injection of liquid crystal molecules LC through an entrance EN of the cavity CV. This can make it easy to inject the liquid crystal molecules LC into the cavity CV.

A method of fabricating a LCD according to an embodiment will now be described.

FIGS. 6 through 16 are cross-sectional views illustrating operations of a method of fabricating a LCD according to an embodiment.

Figure 6:
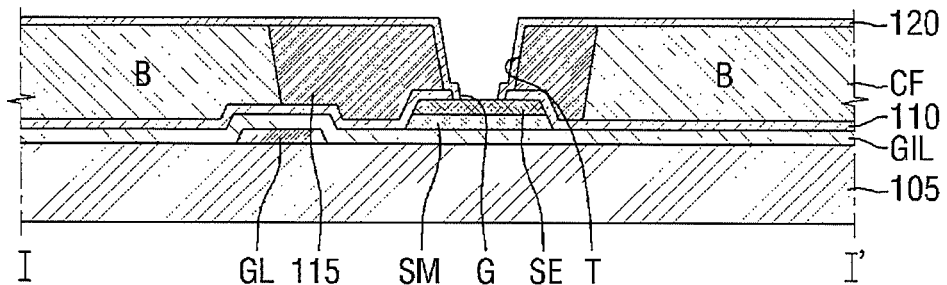
FIGS. 6, 7, 8, 9, 10, 11, 12, 13, 14, 15, and 16 are cross-sectional views illustrating operations of a method of fabricating a LCD according to an embodiment.

Referring to FIG. 6, a signal electrode, e.g., a source electrode SE is formed on a substrate 105.

Specifically, a conductive layer is formed on the substrate 105 by a sputtering process and then patterned by a photolithography process to form a gate line GL. Here, a gate pad GP (see FIG. 1) and a gate electrode GE (see FIG. 1) are also formed simultaneously.

A gate insulating layer GIL is formed on the substrate 105 having the gate pad GP (see FIG. 1) and the gate electrode GE (see FIG. 1) by a plasma enhanced chemical vapour deposition (PECVD) process.

A semiconductor material layer and a conductive layer are stacked sequentially on the gate insulating layer GIL and then patterned using a photolithography process to form a data line DL, the source electrode SE connected to the data line DL, a drain electrode DE (see FIG. 1) separated from the source electrode SE, and a semiconductor layer SM formed in a region corresponding to a region between the source electrode SE and the drain electrode DE (see FIG. 1). At this time, a data pad DP (see FIG. 1) is also formed. The gate electrode GE (see FIG. 1), the semiconductor layer SM, the source electrode SE and the drain electrode DE (see FIG. 1) constitute a thin-film transistor TFT (see FIG. 1).

An insulating layer 110 is formed on the gate insulating layer GIL to cover the thin-film transistor TFT (see FIG. 1)

and the data pad DP (see FIG. 1). The insulating layer 110 may be a passivation layer and formed of silicon nitride or silicon oxide by a PECVD process.

Color filters CF are formed on the insulating layer 110 at positions corresponding to pixel areas PA (see FIG. 1). Each of the color filters CF may be any one of a red filter R, a green filter G, and a blue filter B. The color filters CF may be formed by patterning an organic polymer material using a photolithography process or by printing the organic polymer material using an inkjet process.

A first light-blocking pattern 115 is formed on the insulating layer 110, i.e., on the same layer as the color filters CF. The first light-blocking pattern 115 may be disposed on the insulating layer 110 at a position corresponding to an edge of each of the pixel areas PA (see FIG. 1). The first light-blocking pattern 115 may be formed on the source electrode SE to have a trench T which extends to and partially exposes the source electrode SE. The first light-blocking pattern 115 may be formed by patterning light-blocking organic matter using a photolithography process.

A first capping layer 120 is formed on the color filters CF and the first light-blocking pattern 115 to cover the color filters CF, the first light-blocking pattern 115 and the source electrode SE. Here, the first capping layer 120 is formed to have an exposing groove G which extends to and partially exposes the source electrode SE. The first capping layer 120 may be formed by patterning organic matter using a photolithography process.

Figure 7:
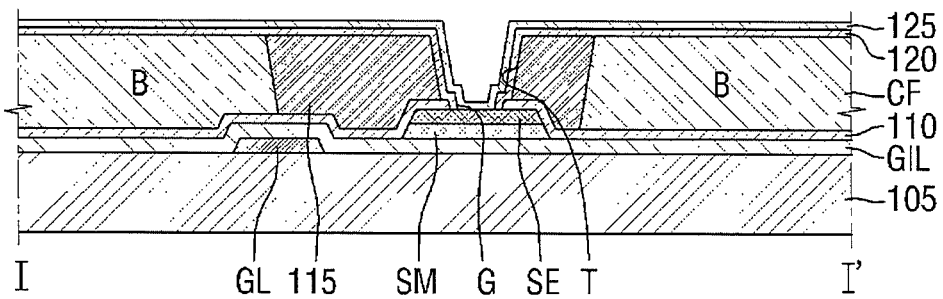

Referring to FIG. 7, a first passivation layer 125 is formed along the first capping layer 120 to cover the exposing groove G of the first capping layer 120. The first passivation layer 125 may be formed of silicon nitride or silicon oxide using a deposition method.

Figure 8:
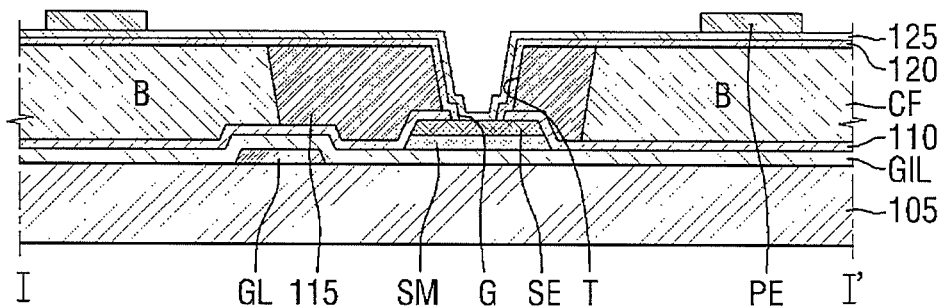

Referring to FIG. 8, a pixel electrode PE is formed on each of the color filters CF. That is, the pixel electrode PE is formed on the first capping layer 120 at a position corresponding to each of the pixel areas PA (see FIG. 1). The pixel electrode PE is connected to the drain electrode DE (see FIG. 1). The pixel electrode PE may be formed by forming a transparent conductive material layer on the first capping layer 120 and patterning the transparent conductive material using a photolithography process.

Figure 9:
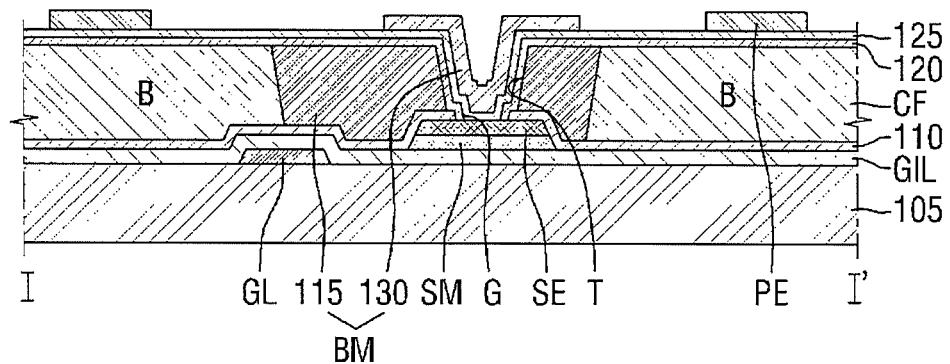

Referring to FIG. 9, a second light-blocking pattern 130 is formed on the trench T of the first light-blocking pattern 115 to cover the source electrode SE and include at least one metal layer. The metal layer may be formed of any one of Cr, CrOx, IZO, Ti, Al and Ni. In addition, the second light-blocking pattern 130 may include a low-reflective metal layer. The low-reflective metal layer may include a Ti-containing first metal layer formed on the trench T and an IZO-containing second metal layer formed on the first metal layer. In addition, the second light-blocking pattern 130 may be formed such that a height of the second light-blocking pattern 130 from a flat surface of the first passivation layer 125 is equal to or less than one tenth of a height of a cavity CV (see FIG. 2) from the flat surface of the first passivation layer 125. The second light-blocking pattern 130 may be formed using a photolithography process. In an exemplary embodiment, a second light-blocking pattern 230 (see FIG. 5) may be formed using a printing process such as inkjet printing.

Figure 10:
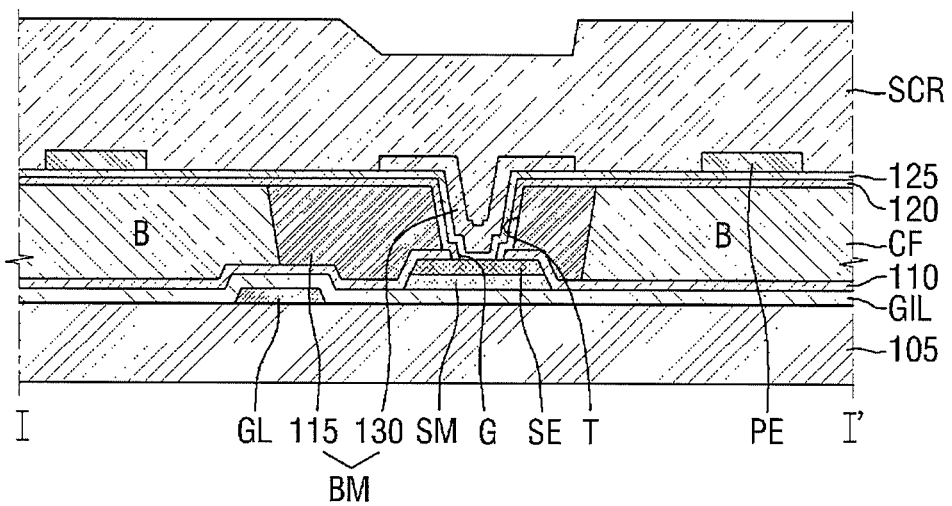

Referring to FIG. 10, a sacrificial layer SCR is formed on the first passivation layer 125, on which the pixel electrode PE is formed, at a position corresponding to the pixel areas PA (see FIG. 1). The sacrificial layer SCR covers the pixel electrode PE. The sacrificial layer SCR may have a concave groove on the second light-blocking pattern 130. The sacrificial layer SCR may be formed by patterning a photosensitive material using a photolithography process.

Figure 11:
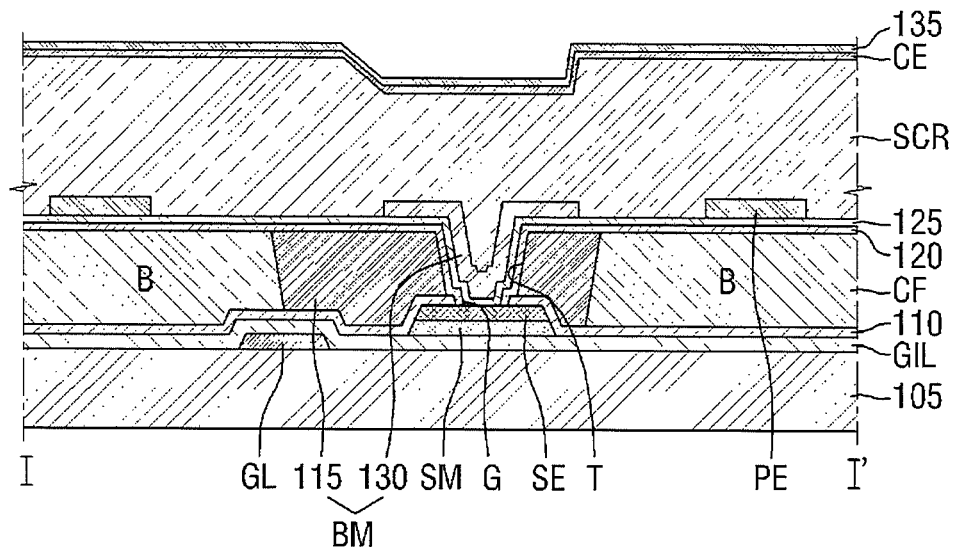

Referring to FIG. 11, a common electrode CE and a second passivation layer 135 are formed sequentially on the sacrificial layer SCR. The common electrode CE may be formed of ITO or IZO by a deposition process, and the second passivation layer 135 may be formed at least one of $SiN_x$, $SiO_x$ and $SiO_xN_y$ by a deposition process.

Figure 12:
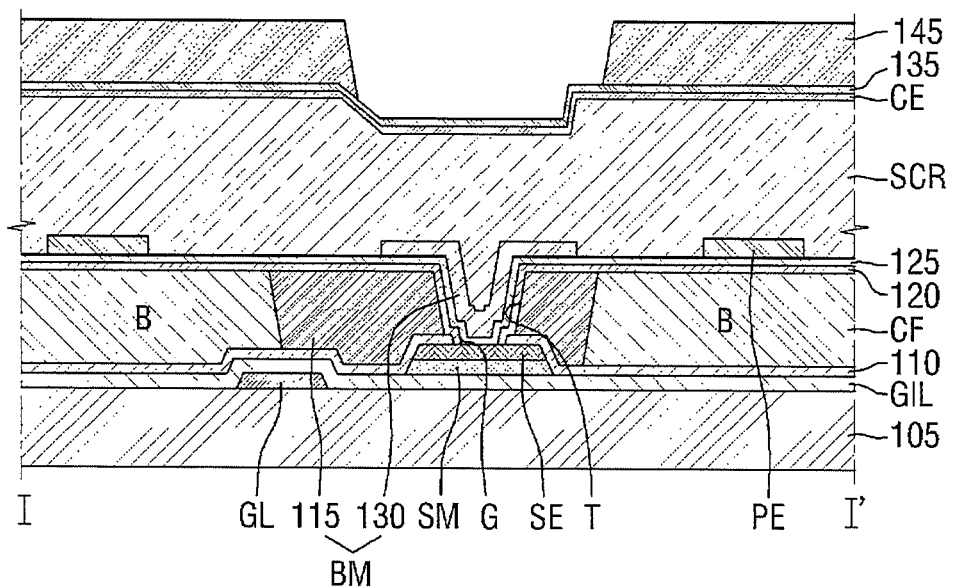

Referring to FIG. 12, a cover layer 145 is formed on the second passivation layer 135. The cover layer 145 may be formed of an organic material. The cover layer 145 may be formed using a photolithography process to have a through hole in a region corresponding to an entrance EN (see FIG. 2) of the cavity CV (see FIG. 2) which is formed by removing the sacrificial layer SCR.

Figure 13:
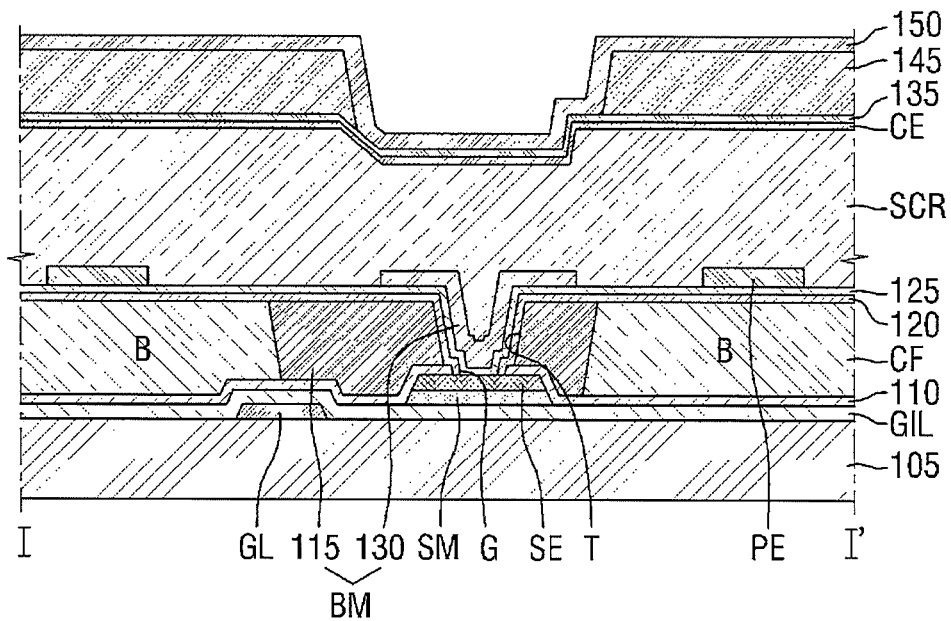

Referring to FIG. 13, a third passivation layer 150 is formed on the cover layer 145. The third passivation layer 150 may be formed of $SiN_x$ by a deposition process.

Figure 14:
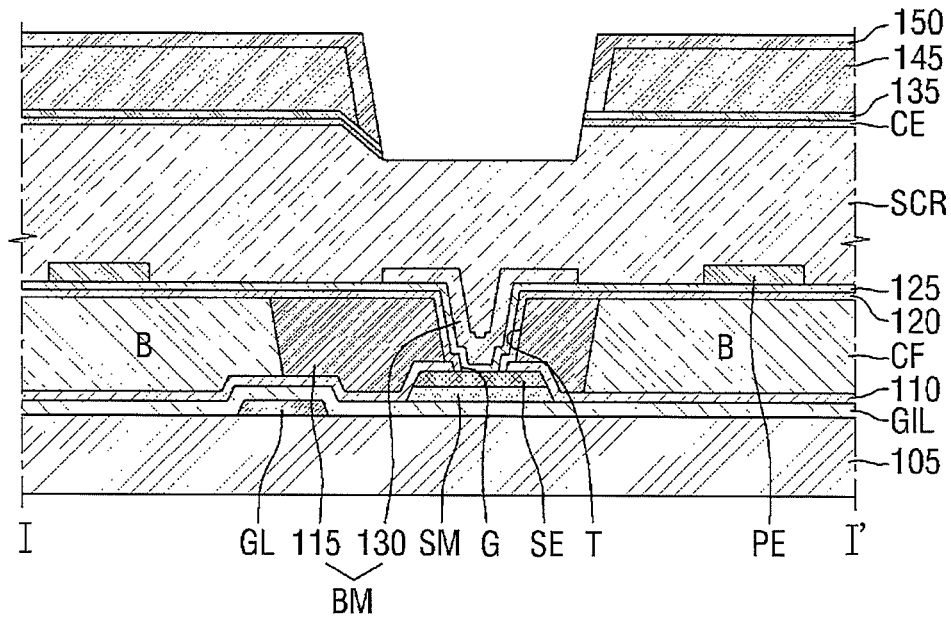

Referring to FIG. 14, a region of each of the third passivation layer 150, the second passivation layer 135, and the common electrode CE which corresponds to the entrance EN (see FIG. 2) of the cavity CV (see FIG. 2) is removed by a photolithography process.

Figure 15:
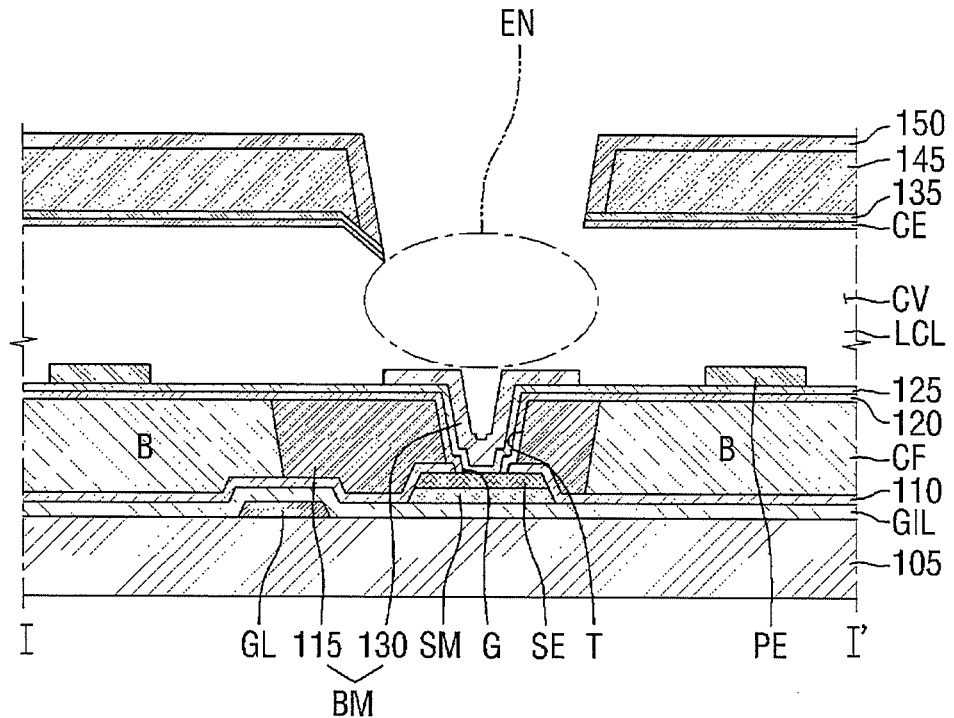

Referring to FIG. 15, the sacrificial layer SCR is removed. As a result, the cavity CV into which liquid crystal molecules LC are injected and the entrance EN of the cavity CV which is a passage through the liquid crystal molecules LC are injected are formed. The removal of the sacrificial layer SCR may be achieved by an etching process and a stripping process. Then, an $O_2$ ashing process may be performed to remove residues within the cavity CV.

Once the cavity CV is formed, an alignment layer 140 is formed along inner walls of the cavity CV. Here, the alignment layer 140 may be formed to cover the pixel electrode PE. After the formation of the alignment layer 140, a liquid crystal layer LCL is formed by injecting the liquid crystal molecules LC into the cavity CV.

Figure 16:
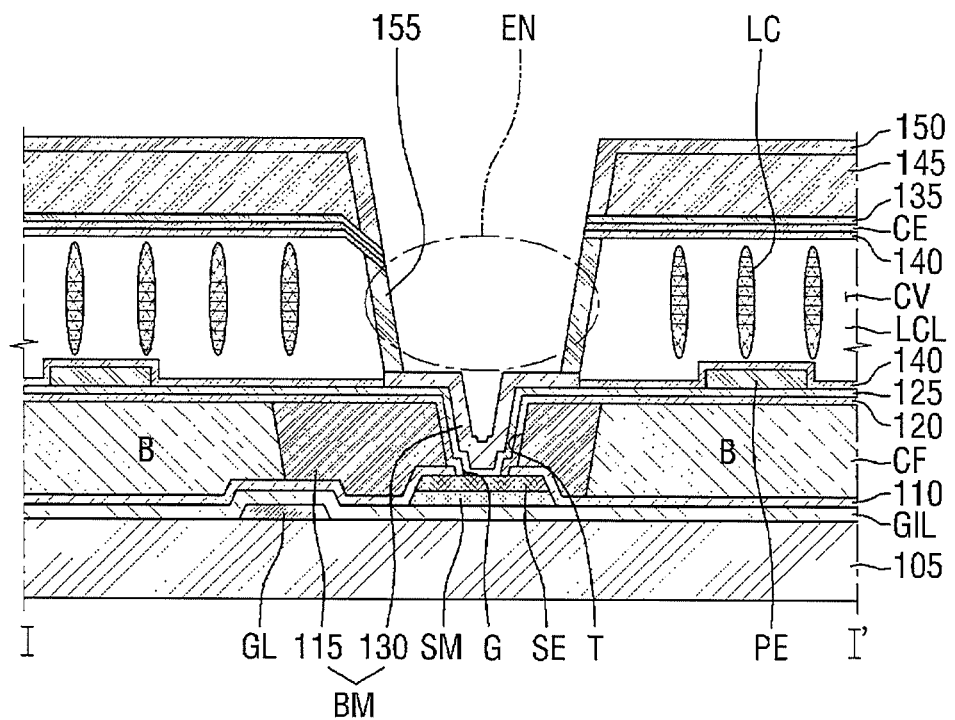

Referring to FIG. 16, a sealing layer 155 is formed to seal the entrance EN of the cavity CV. The sealing layer 155 may be formed of a sealing material that does not react with the liquid crystal molecules LC injected into the cavity CV.

Then, a second capping layer 160 is formed on the third passivation layer 150, thereby completing the LCD 100 of FIG. 2. The second capping layer 160 may be formed of an insulating material using a deposition method.

Although not shown in the drawings, the method of fabricating a LCD may further include forming an encapsulating layer on the second capping layer 160. The encapsulation layer may negate the need for a substrate which is coupled to another substrate on which a thin-film transistor is formed in a conventional LCD.

In a LCD according to an embodiment, a light-blocking pattern is formed thin using a metal. Therefore, a height of the light-blocking pattern from a flat surface of a passivation layer is far smaller than a height of a cavity from the flat surface of the passivation layer.

Accordingly, in the LCD according to the embodiment, the light-blocking pattern does not act as a barrier when liquid crystal molecules are injected through an entrance of the cavity. This can make it easy to inject the liquid crystal molecules into the cavity.

However, the embodiments are not restricted to the one set forth herein. The above and other effects of embodiments will become more apparent to one of daily skill in the art to which the embodiment pertains by referencing the claims.

What is claimed is:

1. A liquid crystal display (LCD) comprising:
   a substrate;
   a signal electrode on the substrate;
   a first light-blocking pattern on the signal electrode, the first light-blocking pattern having a trench extending to at least part of the signal electrode; and
   a second light-blocking pattern on the trench of the first light-blocking pattern and covering the signal electrode,
   wherein the second light-blocking pattern comprises at least one metal layer;
   color filters on the same layer as the first light-blocking pattern on the substrate;
   a first electrode on each of the color filters;
   a second electrode on the first electrode and insulated from the first electrode and defining a cavity between the second electrode and the first electrode;
   a first capping layer which is formed between the color filters and the first electrode to cover the color filters, the first light-blocking pattern and the signal electrode; and
   a first passivation layer between the first capping layer and the first electrode along the first capping layer.

2. The LCD of claim 1, further comprising a thin-film transistor on the substrate and comprising a gate electrode, a source electrode and a drain electrode, wherein the signal electrode is any one of the source electrode and the drain electrode.

3. The LCD of claim 1, wherein the metal layer is formed of any one of Cr, CrOx, IZO, Ti, Al and Ni.

4. The LCD of claim 1, wherein the second light-blocking pattern comprises a low-reflective metal layer, wherein the low-reflective metal layer comprises a Ti-containing first metal layer and an IZO-containing second metal layer formed on the first metal layer.

5. The LCD of claim 1, wherein the first light-blocking pattern is formed of light-blocking organic matter.

6. The LCD of claim 1, wherein a height of the second light-blocking pattern from a flat surface of the first passivation layer is equal to or less than one tenth of a height of the cavity from the flat surface of the first passivation layer.

7. The LCD of claim 1, further comprising:
   a cover layer on the second electrode;
   a liquid crystal layer comprising liquid crystal molecules in the cavity;
   an entrance of the cavity; and
   a sealing layer sealing the entrance of the cavity.

8. The LCD of claim 1, wherein the second light-blocking pattern is conformally along inner walls of the trench.

9. The LCD of claim 1, wherein the second light-blocking pattern fills at least part of the trench.

10. A method of fabricating a LCD comprising:
    forming a signal electrode on a substrate;
    forming a first light-blocking pattern, which has a trench extending to at least part of the signal electrode, on the signal electrode;
    forming a second light-blocking pattern, which covers the signal electrode and comprises at least one metal layer, on the trench of the first light-blocking pattern;
    forming color filters on the same layer as the first light-blocking pattern on the substrate;
    forming a first electrode on each of the color filters;
    forming a second electrode on the first electrode to be insulated from the first electrode and define a cavity between the second electrode and the first electrode;
    forming a first capping layer between the color filters and the first electrode to cover the color filters, the first light-blocking pattern and the signal electrode; and
    forming a first passivation layer between the first capping layer and the first electrode along the first capping layer.

11. The method of claim 10, wherein the forming of the second light-blocking pattern comprises forming the metal layer using any one of Cr, CrOx, IZO, Ti, Al and Ni.

12. The method of claim 10, wherein the forming of the second light-blocking pattern comprises forming the second light-blocking pattern to comprise a low-reflective metal layer.

13. The method of claim 12, wherein the forming of the second light-blocking pattern to comprise the low-reflective metal layer comprises forming a Ti-containing first metal layer on the trench of the first light-blocking pattern and forming an IZO-containing second metal layer on the first metal layer.

14. The method of claim 10, wherein the forming of the second light-blocking pattern is performed using a photolithography process or a printing process.

15. The method of claim 10, wherein the forming of the second light-blocking pattern comprises forming the second light-blocking pattern such that a height of the second light-blocking pattern from a flat surface of the first passivation layer is equal to or less than one tenth of a height of the cavity from the flat surface of the first passivation layer.

16. The method of claim 10, further comprising:
    forming a cover layer on the second electrode;
    forming an entrance of the cavity; and
    forming a liquid crystal layer by injecting liquid crystal molecules into the cavity through the entrance of the cavity.

17. The method of claim 16, wherein the cavity is formed between the first electrode and the second electrode by forming a sacrificial layer on the first electrode, forming the second electrode and a second passivation layer on the sacrificial layer, forming the cover layer on the second passivation layer, and removing the sacrificial layer.

18. The method of claim 16, further comprising forming a sealing layer which seals the entrance of the cavity.

* * * * *